Sept. 12, 1939. H. T. SMITH 2,173,046

SALTCELLAR

Filed Oct. 15, 1938

Inventor

*Harry T. Smith*

By *Clarence A. O'Brien and Hyman Berman*

Attorneys

Patented Sept. 12, 1939

2,173,046

UNITED STATES PATENT OFFICE 2,173,046

SALTCELLAR

Harry T. Smith, Salisbury, Md.

Application October 15, 1938, Serial No. 235,273

1 Claim. (Cl. 65—45)

The present invention, although applicable to various types of containers for moisture-laden commodities, is preferably in the form of an improved saltcellar, the outstanding purpose of the invention being to dry and thereby condition the charge of salt to facilitate free delivery through the customary perforated closing cap.

As substantially implied by the introductory general statement and object of the invention, I am not unmindful that the prior art teaches the use of absorption and deliquescent inserts for bread and crackerboxes and the like. That is to say, it is admittedly old to place in a commodity container, suitable means to gradually collect the moisture from the air in the container and to thereby preserve the commodity in a more readily usable and palatable condition. Despite this fact, however, there seems to be a long-felt need for the development of a saltcellar having self-contained means to maintain the salt in a comparatively dry granular state to expedite pouring and shaking.

It follows, therefore, that I have conceived and reduced to practice, a saltcellar having mounted therein a deliquescent interceptor, the same being of a mixture of calcium chloride and other ingredients and so shaped as to aptly fulfill the requirements of a supplementary feature of this type.

Other features and advantages will become more readily apparent from the following description and the accompanying illustrative drawing.

Figure 1:
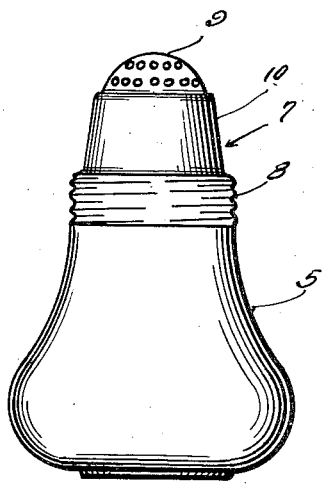
Figure 1 is an elevational view of a saltcellar of the type forming the specific subject matter of this invention.
Figure 3:
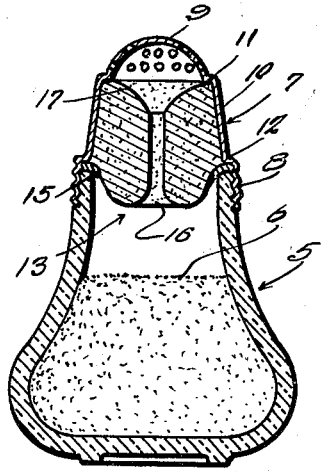
Figure 3 is a central vertical section which may be said to be taken on the plane of the line 3—3 of Figure 2.
Figure 2:
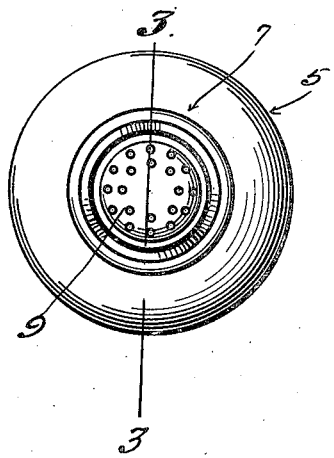
Figure 2 is a top plan view of Figure 1.
Figure 4:
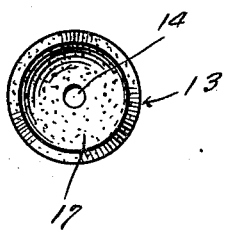
Figure 4 is a top plan view of the deliquescent and salt conditioning insert per se.

It is evident, even from the preceding description, that shape and materials are not of greatest importance. That is to say, the container 5 may be of any appropriate shape and capacity to suitably accommodate the customary table salt 6. The cap 7, however, is preferably of a special configuration. That is to say, the cap is preferably of some noncorrosive metal and includes a suitable attaching rim 8 to be threaded or otherwise connected with the container or receptacle. The crown portion 9 is of somewhat conventional concavo-convex design and provided with a multiplicity of marginally arranged discharge and shaking ports. The rim 10, however, is such that its annular tapered form provides a shoulder as at 11, and another annular shoulder at the point 12. Hence, this defines a tapered channel to accommodate the insert 13.

As before stated, the insert is in the nature of a check valve or interceptor, and partitions the main chamber from the discharge cap. Ordinarily, so that the part 13 may have proper absorption properties, it is made from a solidified mass essentially calcium chloride. Obviously, however, any appropriate deliquescent composition of matter is suitable for the formation of this part. It is desirable, however, that the so-called deliquescent conditioner or insert be of a special configuration. That is to say, it is in the nature of a tapered block to fit into the channel 10. The central bore 14 provides a suitable canal or passage for delivery of the salt from the main container into the cap. The inner protruding end extending beyond the packing washer 15 has a flared intake mouth 16. The opposite end is also formed with a cavity, this being somewhat larger and constituting a return funnel for salt which is pocketed therein.

In practice the salt is placed in the regular compartment approximately to a point three-quarters full, and the deliquescent unit and top are assembled and screwed on to the body forming the regular appearing saltcellar. When the cellar is inverted the flared intake opening feeds the salt into the passage and it is discharged out through the apertures in the cap in the customary way. Certain of the salt which is left trapped between the interceptor in the cap will gradually run back into the main container. Hence, the part 13 acts as a drier, and when it becomes overly saturated it must be removed, appropriately dried by suitable means and then replaced.

It is understood that the deliquescent material, such as calcium chloride, draws the moisture out of the air in the container, storing it away to its full capacity. When the latter condition is reached the deliquescent unit must be removed and dried out and put back ready for use again.

It is thought that the description taken in connection with the drawing will enable a clear understanding of the invention to be had. Therefore, a more lengthy description is thought unnecessary.

While the preferred embodiment of the invention has been shown and described, it is to be understood that minor changes coming within the field of invention claimed may be resorted to if desired.

I claim:

In a saltcellar, a hollow body forming a container, an apertured cap on said container, said cap having a rim channel, a block of deliquescent material adapted to be used as an insert for said saltcellar, said deliquescent block being of a general external tapered form, and adapted to be held in said channel, and said deliquescent unit having a central bore, the intake end being flared and the discharge end being enlarged and countersunk constituting a return funnel.

HARRY T. SMITH.